J. F. APPLEBY.
COTTON HARVESTING MACHINE.
APPLICATION FILED APR. 13, 1906. RENEWED MAR. 9, 1912.
1,024,714.
Patented Apr. 30, 1912.
3 SHEETS—SHEET 2.
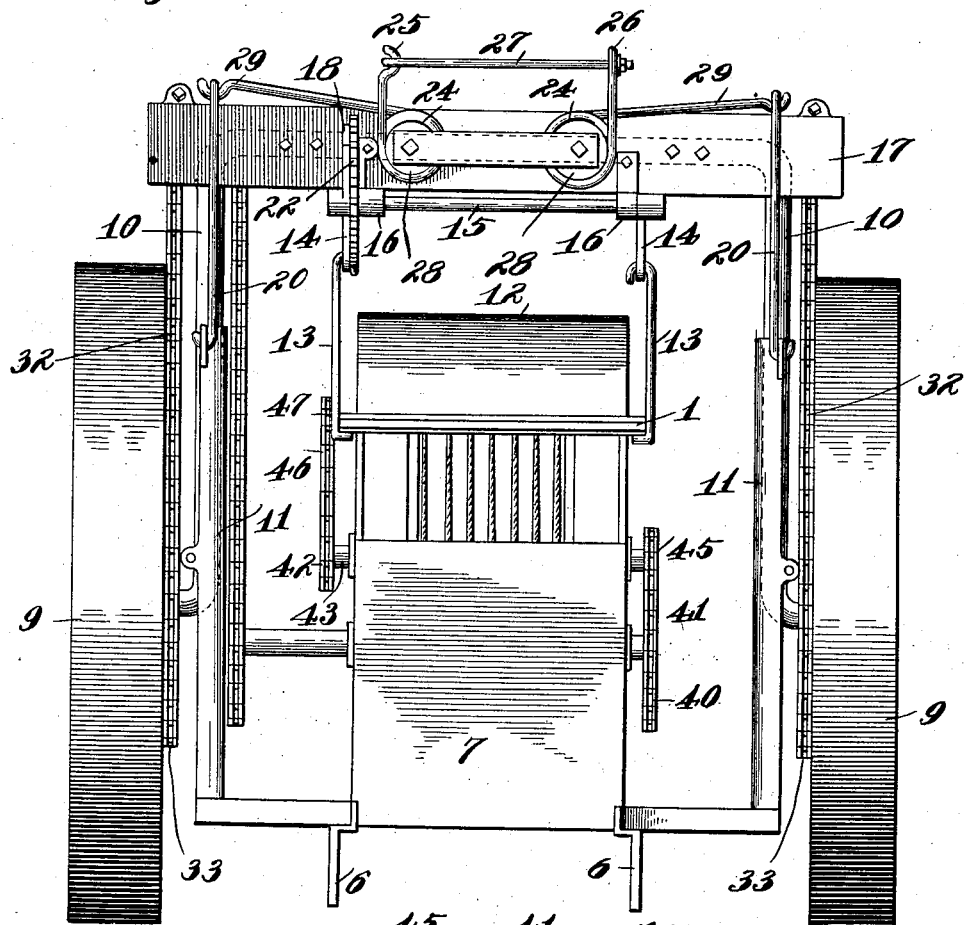
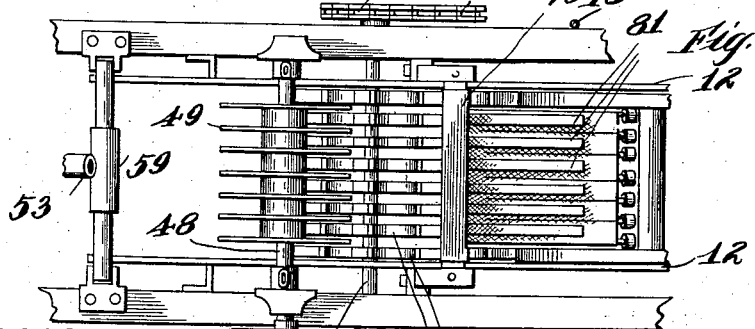
Witnesses.
D. A. Taubenschmidt
Leon Stroh
Inventor.
John F. Appleby,
By G. L. Cragg
Atty J. F. APPLEBY.
COTTON HARVESTING MACHINE.
APPLICATION FILED APR. 13, 1906. RENEWED MAR. 9, 1912.
1,024,714.
Patented Apr. 30, 1912.
3 SHEETS—SHEET 3.
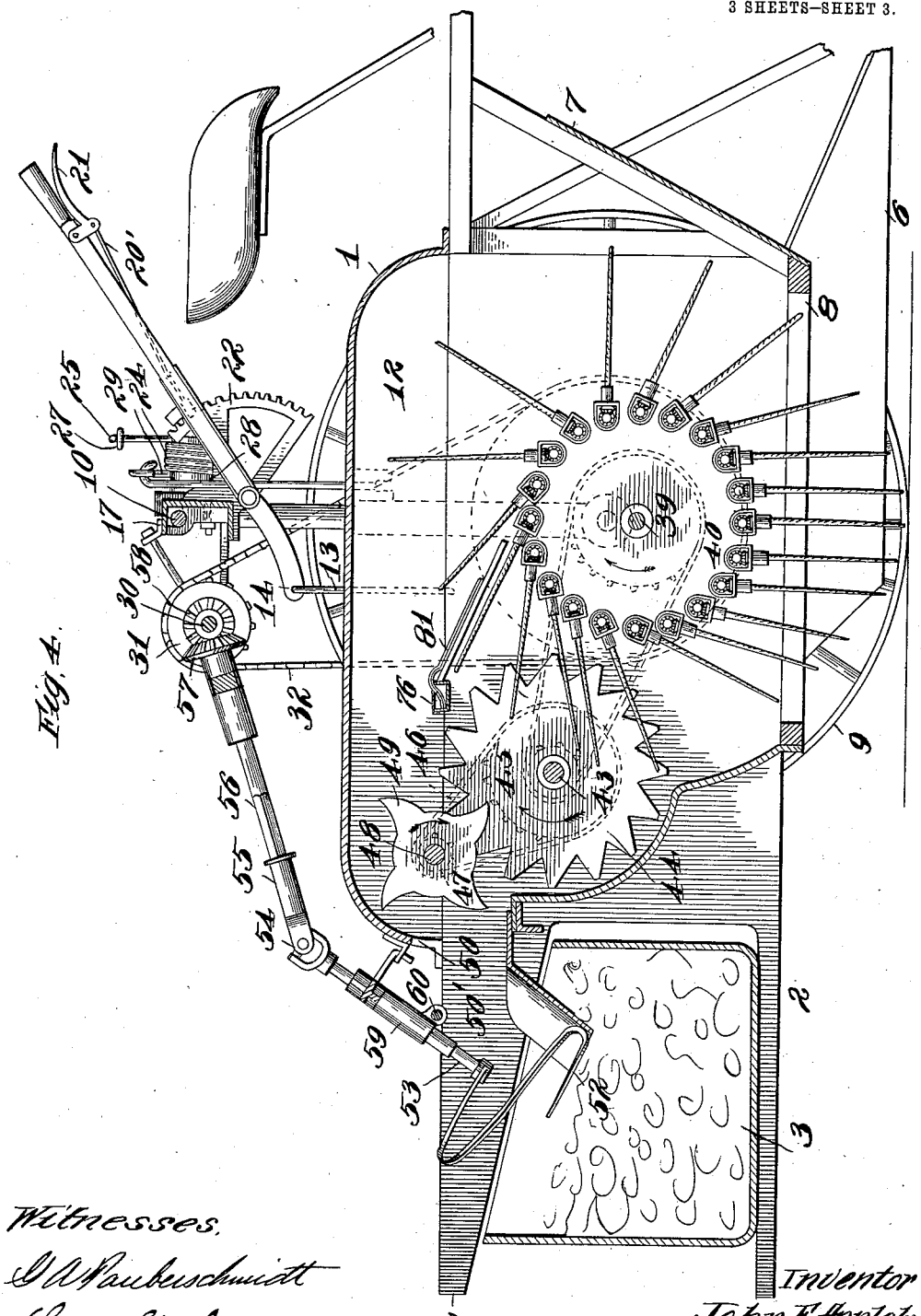
Witnesses.
Inventor
John F. Appleby
By G. L. Cragg
Atty

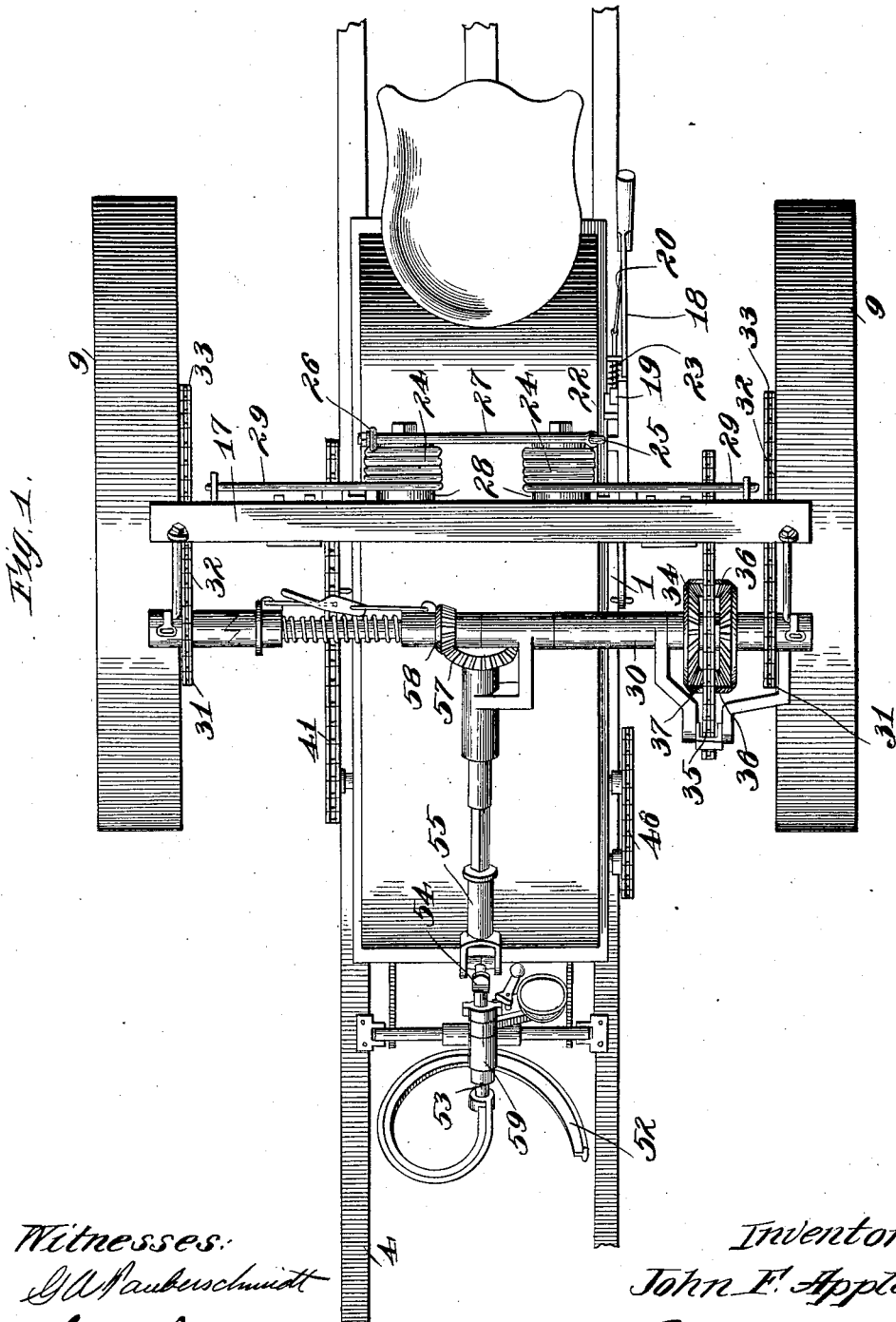

UNITED STATES PATENT OFFICE.

JOHN F. APPLEBY, OF CHICAGO, ILLINOIS, ASSIGNOR TO DIXIE COTTON PICKER CO., OF REDFIELD, SOUTH DAKOTA, A CORPORATION OF SOUTH DAKOTA.

COTTON-HARVESTING MACHINE.

1,024,714. Specification of Letters Patent. Patented Apr. 30, 1912.

Original application filed January 8, 1906, Serial No. 295,100. Divided and this application filed April 13, 1906, Serial No. 311,592. Renewed March 9, 1912. Serial No. 682,753.

*To all whom it may concern:*

Be it known that I, JOHN F. APPLEBY, citizen of the United States, residing at Chicago, in the county of Cook and State of Illinois, have invented a certain new and useful Improvement in Cotton-Harvesting Machines, (being a division of my application, Serial No. 295,100, filed January 8, 1906,) of which the following is a full, clear, concise, and exact description, reference being had to the accompanying drawings, forming a part of this specification.

My invention relates to cotton picking or harvesting machines, the present application being a division of my co-pending application Serial No. 295,100, filed January 8, 1906.

In the device of my Patent No. 798,651, dated Sept. 5, 1905, the cotton picking fingers, the stripping mechanism and the cleaning mechanism associated therewith, together with certain coöperating parts, were provided in a casing which could be raised and lowered. To effect this operation of the casing, a hand operated crank, actuating sprocket wheels and a chain, were employed.

The device of my present invention relates to the general class of cotton picking machines disclosed in my said application and relates particularly to the elevating mechanism for raising and lowering the casing.

In accordance with my invention, I provide a simple lever mechanism that will permit the elevation and depression of the casing very quickly and with but little effort. In practising this feature of my invention, I desirably employ spring mechanism carried by a portion of the machine (which is distinct from the casing), as, for example, the shaft of the machine, which spring mechanism exerts a lifting action upon the casing, but which lifting action is not sufficient to operate the casing unless it is supplemented by hand power, desirably exerted through a comparatively long lever. The casing is normally locked so that the weight thereof is removed from the spring mechanism, but when the casing is to be raised and lowered, the locking action is broken so that the lever may then become effective. When the locking action is broken, the casing is then directly suspended upon the spring mechanism and the spring mechanism serves to counter-act to a large extent the weight of the casing and the operator seated thereon, so that the operation of moving the casing may be accomplished with comparatively slight effort.

I will explain my invention more fully by reference to the accompanying drawings, illustrating one of the embodiments thereof, the embodiment illustrated being that which is preferred.

In the drawings—Figure 1 is a plan view illustrating so much of the mechanism as is necessary to an understanding of the invention. Fig. 2 is a view from the front of part of the mechanism entering into the machine. Fig. 3 is a view in plan of a part of the mechanism. Fig. 4 is a longitudinal section in elevation illustrating certain parts of the machine.

Like parts are indicated by similar characters of reference throughout the different figures.

The picking, stripping and cleaning mechanism hereinafter to be particularly specified is mounted within a casing or housing 1, that desirably has a porch 2 upon which a basket 3 that is to receive the picked cotton, is placed. A skirt or gatherer formed in two sides 6 is provided at the base of the casing for the purpose of laterally gathering the cotton bushes to be within range of the picking mechanism to be described. An apron 7 is mounted at the front of the machine a sufficient distance above the bottom edges of the skirt or gatherer to depress the bushes to a uniform level, and a substantially horizontal grate 8, composed of longitudinally-disposed bars, is continued from the lower margin of the apron 7 rearwardly, so that the level to which the bushes have been depressed may be maintained during the picking operation. A single pair of traction-wheels 9 9 is desirably only employed, upon which the casing is mounted in a manner to be hereinafter set forth.

In order that the casing, together with the grate 8, the picking mechanism, and other associate parts, may be raised and lowered, I preferably employ the mechanism now to be described.

The wheels 9 9 are mounted upon a U-shaped axle 10, the U of the axle being inverted. Guides 11 11 are fixed with respect to the side walls 12 12 of the casing. By vertical movement of these guides upon the vertical parts of the U-shaped axle the casing and the mechanism carried thereby are elevated or lowered. Links 13 are anchored to the casing and terminate at their free ends in hooks that pass through arms 14, that are rigidly secured to a shaft 15, the shaft being journaled in bearings 16, that are mounted upon a cross-girder 17 stationary with respect to the axle. A hand lever 18 is rigidly secured to the shaft 15, desirably at one end of said shaft, this hand lever carrying a locking detent 19, a detent rod 20', and a grip 21, which may be operated to actuate the rod 20' to release the locking detent 19 from the locking quadrant or rack 22, this releasing action being effected against the force of a spring 23 provided normally to hold the detent and quadrant in locking relation. By rotating the lever 18, the links 13 may be elevated or lowered to effect the corresponding elevation or depression of the casing. In order that physical effort may be reduced in raising and lowering the casing, I desirably provide a spring mechanism that exerts a lifting action when the locking detent 19 is disengaged from the quadrant 22. This spring mechanism desirably includes two oppositely wound helices 24 of strong steel rod, which thus constitute coiled springs, one coiled spring terminating in a hook 25 while the companion coiled spring terminates in an eye 26. A tension adjusting rod 27 terminates at one end in an eye, by which said rod is engaged with the hook 25, the other end of the rod 27 having threaded thereupon an adjusting nut, the threaded end of the rod 27 passing through the eye 26, the nut serving to adjust the space between the portions 25 26. The coiled springs are wound about cores 28 that are carried by the girder 17, and each coiled spring has an outwardly extending hook 29 that is connected with the link 20 shown attached at its lower end to the casing.

It will be seen that when the elements 19 22 are separated, that the casing is carried by the coiled springs 24 by reason of the engagement of the portions 29 of said springs with the aforesaid links 20, so that the operator, who may remain upon his seat, may have little difficulty in raising or lowering the casing. The extent to which the springs 24 counter-act the weight of the casing is determined by the adjustment effected by the adjusting device 27.

The picking, stripping and cleaning mechanism is operated from a main shaft 30 that is driven by the sprocket-gears 31 located at its outer ends and rotated by the sprocket-chains 32 operated by the sprocket-wheels 33, there being one such sprocket-wheel 33 directly coupled and coaxial with each traction-wheel. In order that the single shaft 30 may be in driven connection with both traction-wheels and at the same time permit one of the traction-wheels to move faster than the other, as in making turns, the said shaft 30 is made in sections united by a differential gear 34. A third sprocket-wheel 35 may constitute the frame that carries the gears 36 that form component parts of the gearing 34 in a manner well understood by those skilled in the art, for it is by such an arrangement that said sprocket-wheel 35 may be rotated through the agency of both sections of the shaft 30, whether said sections are rotating at the same or different speeds. The sprocket-wheel 35 drives a sprocket-chain 37, that in turn rotates a sprocket-gear 38, which directly causes the operation of the picking, stripping and cleaning mechanism, as will be described.

As hitherto stated, the sprocket-wheel 38 is the direct cause of the operation of the pickers, strippers and cleaners, the shaft 39 directly operating the picking mechanism, as will be specified, the sprocket-gear 40 upon said shaft 39 operating the sprocket-chain 41, that in turn rotates the sprocket-gear 45 mounted upon a shaft 43, upon which shaft are fixed the strippers 44. Where cleaners are employed, the shaft 43 may have mounted thereon a sprocket-wheel 42, that operates the sprocket-chain 46, which sprocket-chain causes the rotation of a sprocket-wheel 47 fixed upon a shaft 48, upon which shaft are also fixed cleaning elements 49 in the form of wheels, one for each stripping-cylinder slot. The cotton that is picked and cleaned is passed through an opening 50 into the basket below the opening. The apron $50^1$ holds the cotton in the path of the packer. The cotton when it reaches a suitable height in the basket, is packed by the packing spiral 52 which is rotated by a shaft 53 that is flexibly coupled by the flexible joint 54 with a sleeve 55, movable back and forth thereupon and rotating with a shaft 56, that carries a bevel-gear 57 adapted to mesh with the bevel-gear 58 splined upon the driving shaft 30. The shaft 53 works within a sleeve 59 that is anchored and held at 60 60 upon the porch 4, said shaft being longitudinally movable in said sleeve 59 so that the packing spiral may be thrust upward as the cotton within the basket is being packed, the packing spiral thereby automatically accommodating itself to the changing level of the cotton.

As described in my original application 295,100, filed January 8, 1906, I preferably place a coating of oil or other suitable material upon the fingers while they are being bodily moved and also while they are not rotating about their individual axes, to which end I employ an oil receptacle 76 that is mounted upon the inner faces of the side walls of the casing, into which receptacle wicking 81 projects. This wicking is slit in the planes of movement of the picking fingers so that as the picking fingers bodily move, they may pass through the slits, and in passing through, be sufficiently coated with the oil. The object of this arrangement, as stated in my copending original application is to prevent foreign matter from being sufficiently acquired by the picking fingers that would prevent the picking fingers from efficiently picking the cotton.

There are certain features disclosed in my present application that are claimed in my divisional application Serial No. 311,591, filed April 13, 1906, this latter application being also a division of my original application Serial No. 295,100, filed January 8, 1906.

While I have herein shown and described the preferred embodiment of my invention, I do not wish to be limited to the precise construction shown, as changes may readily be made therein without departing from the spirit of the invention, but,

Having thus described my invention, I claim as new and desire to secure by Letters-Patent:

1. A cotton harvesting machine including a casing, operating mechanism of the machine carried by the casing, a hand lever for raising and lowering the casing, a locking quadrant or rack, a locking device carried by the lever coöperating with said rack, whereby the casing may be maintained in the position to which it may be adjusted, and spring mechanism taking part in supporting the casing, said mechanism comprising two helices of spring metal terminating in outwardly extending supporting branches and having connection by means of said branches with the casing.

2. A cotton harvesting machine including a casing, operating mechanism of the machine carried by the casing, a hand lever for raising and lowering the casing, a locking quadrant or rack, a locking device carried by the lever coöperating with said rack, whereby the casing may be maintained in the position to which it may be adjusted, spring mechanism taking part in supporting the casing, said mechanism comprising two helices of spring metal terminating in outwardly extending supporting branches and having connection by means of said branches with the casing, and an adjusting device interposed between the remaining ends of the helices for adjusting the tension of the coiled springs.

3. A cotton harvesting machine including a casing, operating mechanism of the machine carried by the casing, spring mechanism taking part in supporting the casing, said mechanism comprising two helices of spring metal terminating in outwardly extending supporting branches and having connection by means of said branches with the casing, and an adjusting device interposed between the remaining ends of the helices for adjusting the tension of the coiled springs.

4. A cotton harvesting machine including a casing, operating mechanism of the machine carried by the casing, spring mechanism taking part in supporting the casing, said mechanism comprising two helices of spring metal terminating in outwardly extending supporting branches and having connection by means of said branches with the casing, an adjusting device interposed between the remaining ends of the helices for adjusting the tension of the coiled springs, and lever mechanism for raising and lowering the casing.

5. A cotton harvesting machine including a casing, operating mechanism of the machine carried by the casing, spring mechanism taking part in supporting the casing, said mechanism comprising two helices of spring metal terminating in outwardly extending supporting branches and having connection by means of said branches with the casing, and a connecting device interposed between the remaining ends of the helices.

In witness whereof, I hereunto subscribe my name this 13th day of March A. D., 1906.

JOHN F. APPLEBY.

Witnesses:
G. L. CRAGG,
WALDO B. STONE.

Copies of this patent may be obtained for five cents each, by addressing the "Commissioner of Patents, Washington, D. C."